United States Patent
Rivola et al.

(10) Patent No.: US 10,894,619 B2
(45) Date of Patent: Jan. 19, 2021

(54) DOSING DEVICE FOR FEEDING INFUSION PRODUCTS

(71) Applicant: I.M.A. INDUSTRIA MACCHINE AUTOMATICHE S.P.A., Ozzano Dell'Emilia (IT)

(72) Inventors: Sauro Rivola, Ozzano Dell'Emilia (IT); Simone Geminiani, Ozzano Dell'Emilia (IT)

(73) Assignee: I.M.A. INDUSTRIA MACCHINE AUTOMATICHE S.p.A., Ozzano Dell'Emilia (IT)

(*) Notice: Subject to any disclaimer, the term of this patent is extended or adjusted under 35 U.S.C. 154(b) by 92 days.

(21) Appl. No.: 16/301,983

(22) PCT Filed: Jun. 15, 2017

(86) PCT No.: PCT/IB2017/053554
§ 371 (c)(1),
(2) Date: Nov. 15, 2018

(87) PCT Pub. No.: WO2017/216748
PCT Pub. Date: Dec. 21, 2017

(65) Prior Publication Data
US 2019/0161216 A1    May 30, 2019

(30) Foreign Application Priority Data
Jun. 17, 2016   (IT) .......................... 102016000062525

(51) Int. Cl.
*B65B 1/36*   (2006.01)
*G01F 11/24*  (2006.01)
(Continued)

(52) U.S. Cl.
CPC ................. *B65B 1/12* (2013.01); *B65B 1/366* (2013.01); *B65B 29/028* (2017.08); *B65B 37/10* (2013.01);
(Continued)

(58) Field of Classification Search
CPC ......... B65B 1/12; B65B 29/028; B65B 37/10; B65B 1/366; B65B 2220/14; G01F 11/24; G01F 13/005
See application file for complete search history.

(56) References Cited

U.S. PATENT DOCUMENTS

| | | |
|---|---|---|
| 2,448,786 A | 9/1948 | Faxon |
| 5,441,342 A | 8/1995 | Koenig et al. |

(Continued)

FOREIGN PATENT DOCUMENTS

WO   WO-2016020822 A1 *  2/2016   ......... B65D 85/8043

OTHER PUBLICATIONS

International Search Report and Written Opinion dated Sep. 11, 2017 for counterpart PCT Application No. PCT/IB2017/053554.

*Primary Examiner* — Craig M Schneider
*Assistant Examiner* — Jason K Niesz
(74) *Attorney, Agent, or Firm* — Shuttleworth & Ingersoll, PLC; Timothy J. Klima

(57) ABSTRACT

A dosing device for feeding infusion products including a dosing drum rotating about an axis and positioned between a continuous strip of filter material, movable along a feed direction, and a primary hopper for containing a primary infusion product; the dosing drum has a plurality of radial chambers for receiving a first dose of primary infusion product from the primary hopper and for releasing the first dose of primary infusion product above the strip of filter material; the device also includes an independent dosing unit of a secondary product including controlled release elements
(Continued)

configured for depositing a second dose of secondary product to define a mixed dose of primary product and secondary product.

14 Claims, 1 Drawing Sheet

(51) Int. Cl.
    *B65B 1/12*     (2006.01)
    *G01F 13/00*     (2006.01)
    *B65B 37/10*     (2006.01)
    *B65B 29/02*     (2006.01)

(52) U.S. Cl.
    CPC ............ *G01F 11/24* (2013.01); *G01F 13/005* (2013.01); *B65B 2220/14* (2013.01)

(56) References Cited

U.S. PATENT DOCUMENTS

| | | | | |
|---|---|---|---|---|
| 5,927,052 A | * | 7/1999 | Nippes | A23F 3/40 |
| | | | | 53/445 |
| 2006/0260274 A1 | * | 11/2006 | Rea | G01F 11/024 |
| | | | | 53/122 |

* cited by examiner

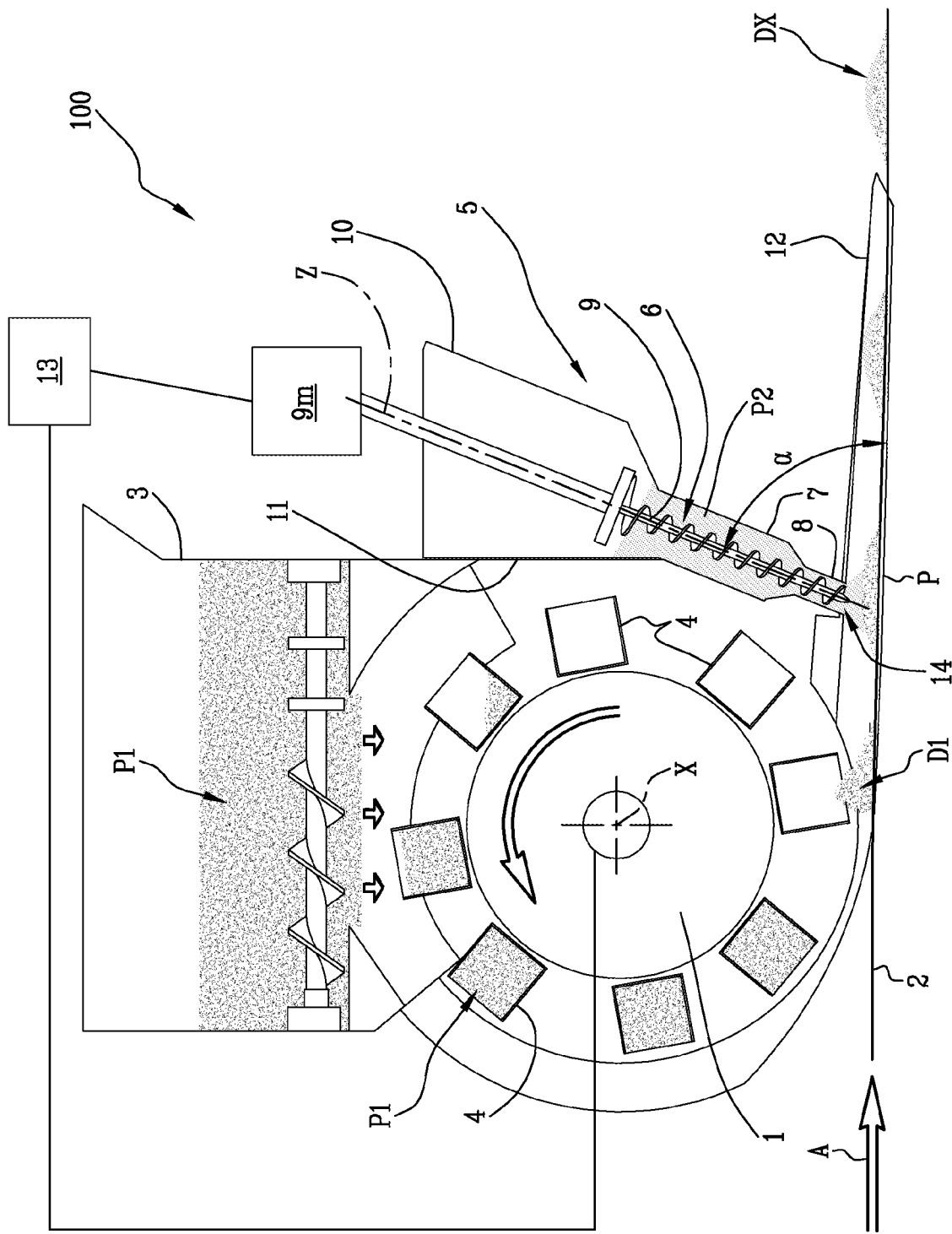

DOSING DEVICE FOR FEEDING INFUSION PRODUCTS

This application is the National Phase of International Application PCT/IB2017/053554 filed Jun. 15, 2017 which designated the U.S.

This application claims priority to Italian Patent Application No. 102016000062525 filed Jun. 17, 2016, which application is incorporated by reference herein.

TECHNICAL FIELD

This invention relates to a dosing device for feeding infusion products.

More specifically, the dosing device according to the invention is applied on an automatic machine for making filter bags for infusion products, such as, for example, tea, coffee, camomile and the like.

BACKGROUND ART

The automatic machines designed for making infusion filter bags comprise a plurality of operating stations located in succession along a production line.

One of the stations which forms part of the machine is a feed station configured for feeding quantities or doses of infusion product on a continuous strip of filter material used to make filter bags.

A station for feeding infusion products is known, for example, from patent document EP1771333, which illustrates a dosing device for feeding infusion products comprising a drum, which rotates about a horizontal axis, interposed between a strip of filter material fed continuously along a feed direction and a hopper, which contains the infusion product.

A plurality of radial chambers for containing the infusion product are made in the drum.

Inside each chamber there are dosing pistons movable axially during the rotation between a first upper end operating position, wherein each chamber is facing the hopper for receiving a quantity of product, and a second lower end position, wherein each chamber is facing the strip of filter material for the releasing the dose of infusion product on the strip.

A device structured in this way has proved to be effective and precise and has contributed to significantly increasing the continuous operating speeds of the above-mentioned automatic machines for producing filter bags.

A variant/addition which has for some time been performed on these machines is to add additives/aromatising substances to the infusion products packaged in the filter bags for differentiating/improving the organoleptic properties of the beverage obtained by infusion of these products.

For example, for the filter bags containing mixtures of tea, it is known to add additives (sugar-based)/aromatising substances directly to the mixture of tea in the form of particles, such as granules, extruded, or powder.

Usually, for dosing a mixed product (with primary product, such as, for example, tea, and secondary product, for example an aromatising substance) a mixing is performed according to predefined quantities of each product (primary and secondary) and the mixture is introduced into the hopper to be able to feed the dosing drum.

Now, this type of procedure, whilst on the one hand does not alter the structure of the machine (using the same dosing station), on the other side may result in several drawbacks.

A first drawback is due to the difficult control of the final quality of the dose of product fed to the strip. In effect, the different shape or density of the primary and secondary products may make their mixing non-uniform with the consequent formation of doses with incorrect percentages compared with that desired, with the consequent incorrect formation of the filter bag.

A second drawback is due to the risk of damaging, over time, the mechanical parts of the dosing drum.

In effect, it was noted that the use of an infusion product is mixed with additives or herbs, such as, for example, substances with sugars in powder aromatising substances, can determine a jam, for example, in the movement systems of the radial pistons.

The jamming may be caused by a deposit of these substances, gradually used in the doser, for example between sliding surfaces of the piston and of the cylindrical chamber with a relative increase in the friction coefficient between them and such as to cause the jamming.

Indeed, the constantly increasing friction eventually blocks the axial movement of the piston, bringing the packaging machine to a stop and making it necessary to dismantle the drum in order to clean it or to change it entirely. The stop results in, obviously, quite long stoppages and the need to always provide a spare drum with respective additional costs.

A dosing device is known from patent document U.S. Pat. No. 5,927,052. In this solution the device comprises a first drum (rotating) dosing a secondary aromatising product on the continuous strip of filter material being fed and a second drum (rotating) dosing the primary infusion product located downstream of the first doser relative to the feed direction of the continuous strip of filter material.

Even this solution has several drawbacks.

The use of a second independent doser drum results in the same drawbacks mentioned above with regard to possible jamming of the drum or incorrect dosing due to the type of substance or herb, such as, for example, substances with powdered sugars or flavouring substances.

Moreover, the initial depositing of the additive substance (with a grain size normally less than the primary substance and with greater adhesive properties) can determine:

an incorrect depositing of the primary substance on the continuous strip with possible distribution of the dose in zones prepared subsequently for closing the filter bag which, in effect, would result in the rejection of the product;

the different concentrations of the two products positioned on the strip (secondary product compressed and covered in the primary product) can lead to a process for infusion of the primary product which is not sufficiently balanced for the final user.

DISCLOSURE OF THE INVENTION

The aim of this invention is to provide a dosing device for feeding infusion products which is able to overcome the above-mentioned drawbacks.

More specifically, the aim of this invention is to provide a dosing device for feeding infusion products which is able to dose in a controlled and precise fashion a dose of a primary infusion product and a secondary aromatising or sugar product.

A further aim of this invention is to provide a dosing device for feeding infusion products which is able to maintain a high level of reliability and production speed with optimum final quality of the mixture of dosed product.

These aims are fully achieved by the dosing device for feeding infusion products according to this invention as characterised in the appended claims.

BRIEF DESCRIPTION OF THE DRAWINGS

The invention will be described with reference to a preferred, non-limiting example illustrated in FIG. 1, showing a dosing device for feeding infusion products according to this invention in a schematic side view with some parts in cross section and others cut away for reasons of clarity.

DETAILED DESCRIPTION OF PREFERRED EMBODIMENTS OF THE INVENTION

With reference to the accompanying drawing, a dosing device according to the invention, labelled 100 in its entirety, is used for feeding infusion products (such as, for example, tea, coffee, camomile or the like, and flavouring substances).

Preferably, the dosing device 100 is applicable to automatic machines producing filter bags for infusion products.

The dosing device 100 comprises a dosing drum 1 rotating about an axis X (preferably horizontal).

The dosing drum 1 is positioned between a continuous strip 2 of filter material, movable along a feed direction A (fed by a respective reel not illustrated here for reasons of simplicity), and a primary hopper 3 for containing a primary infusion product P1.

The dosing drum 1 has a plurality of radial chambers 4 each configured for receiving a first dose D1 of primary infusion product P1 at their transit close to the primary hopper 3 and, respectively, for releasing the first dose D1 of primary infusion product P1 at their transit above the strip 2 of filter material, in such a way as to define a succession of first doses D1, equidistant from each other, along the continuous strip 2 of filter material.

In short, the dosing the drum 1 feeds first doses D1 of primary product, such as tea (or coffee, camomile or the like).

The dosing drum 1 may be, for example but without limiting the scope of the invention, of the type described in patent document EP1771333.

As illustrated, the dosing device 100 comprises an independent dosing unit 5, for dosing a second dose D2 of a secondary aromatising or sugar product P2. Advantageously, the independent dosing unit 5 is positioned downstream of the dosing drum 1 relative to the feed direction A.

The independent dosing unit 5 has controlled release elements 6 configured for depositing a second dose D2 of secondary aromatising or sugar product P2 at a respective first dose D1 of primary infusion product P1 deposited on the continuous strip 2 of filter material and in transit beneath the independent unit 5. Advantageously, the controlled release elements 6 are configured for placing the second dose D2 of secondary product P2 at least partly above the respective first dose D1 of primary product P1.

In other words, the dosing device 100 is structured to make up a dose of mixed product DX wherein there are two types of products P1 and P2 (for example, tea and an aromatising or sugar substance).

The dosing device 100 allows a precise and constant composition of the mixed dose DX before the mixed dose DX is closed inside the strip 2 of filter material through the successive stations present in the packaging machine (not illustrated).

According to a preferred embodiment of the invention, the primary product P1 therefore comprises an infusion product such as tea (or camomile, herbal teas and the like), and the secondary product P2 comprises an aromatising or sugar product (in powder, granules, etc.).

As illustrated, the independent dosing unit 5 comprises a feed channel 7, through which the secondary product P2 passes. The feed channel 7 comprises an opening for releasing the secondary product P2 facing the continuous strip 2 of filter material movable along the feed direction A.

In light of this, the feed channel 7 houses the elements 6 for controlled release of the secondary product P2.

Preferably, the feed channel 7 has an end narrowing 8 defining the opening for releasing the secondary product P2.

It should be noted that the controlled release elements 6 are configured for depositing a quantity of secondary product P2 forming the second dose D2 different from the quantity of primary product P1 forming the first dose D1 deposited on the continuous strip 2 of filter material from the radial chambers 4.

Preferably, but not necessarily, the controlled release elements 6 are configured for depositing a quantity of secondary product P2 forming the second dose D2 less than the quantity of primary product P1 forming the first dose D1 deposited on the continuous strip 2 of filter material from the radial chambers 4.

The quantity proportions of primary and secondary products P1 and P2 may vary depending on the type of end product desired until even reaching an equal quantity in a final mixed dose DX.

Again as illustrated, the or controlled release elements 6 comprise an extractor screw 9.

The extractor screw 9 is positioned along the feed channel 7 and has an end at the end narrowing 8 of the feed channel 7.

The extractor screw 9 (and the feed channel 7) can be positioned perpendicularly to the continuous strip 2 of filter material, that is to say, to the feed direction A, therefore vertically, or inclined relative to a vertical direction of an angle of inclination α (less than 90°), as illustrated in the example.

Preferably, the angle of inclination α of the extractor screw 9 (and of the feed channel 7) is between 45° and 75°.

Size, angle of inclination and speed of rotation of the extractor screw 9 determine the quantity of secondary product P2 forming the second dose D2.

Preferably, the independent dosing unit 5 comprises a secondary hopper 10 containing secondary product P2, positioned above the extractor screw 9.

The secondary hopper 10 allows the feed channel 7 and the extractor screw 9 to be kept supplied with the secondary product P2.

It should be noted that, for example, the independent dosing unit 5 is supported by a frame 11 interposed between the independent dosing unit 5 and the dosing drum 1.

In alternative embodiments not illustrated, the primary hopper 3 and the secondary hopper 10 may be made in a shared single body.

This combined structure allows extremely reduced overall dimensions of the dosing device in its entirety to be maintained and to feed the two products in rapid sequence one on the other with a reduced feed step of the continuous strip of filter material.

Advantageously, the dosing device 100 comprises a shaped guard 12 positioned downstream of the dosing drum 1 and designed to fold the continuous strip 2 of filter material to define a continuous tube of filter material which surrounds the mixed doses DX of primary product P1 and secondary product P2.

The shaped guard 12 is configured to form a linear plane P for supporting the continuous strip 2 of filter material.

According to one aspect of the invention, the shaped guard 12 has an opening, or through hole, 14, at which is coupled the independent dosing unit 5, in particular the controlled release elements 6.

In more detail, the release opening of the feed channel 7 is coupled to the shaped guard 12 at the opening 14, so that the secondary product P2 moves from the controlled release elements 6 to the continuous strip 2 of filter material passing through the shaped guard 12.

The continuous strip 2 of filter material is fed on the shaped guard 12 starting from the zone for feeding the primary product P1 and is kept on the shaped guard 12 up to a folding zone further downstream of the dosing device 100 (zone not illustrated).

Preferably, the feed channel 7 and the extractor screw 9 have the corresponding axis Z of longitudinal extension positioned inclined at an angle α relative to the feed direction A.

The angle of inclination α of the feed channel 7 and of the extractor screw 9 is preferably less than a right angle (preferably in a range of between 45° and 75°) so that they can deposit the secondary product P2 in a precise fashion on an irregular surface defined by the dose D1 of primary product and avoiding losses outside the zone occupied by primary product P1.

The feed channel 7 and the extractor screw 9 are inclined in such a way as to have the end narrowing 8 close to the zone of discharging the primary product P1 by the radial chambers 4 relative to the position of the upper part 5 having the secondary hopper 10 for containing the secondary product P2.

The extractor screw 9 is connected to a motor-driven unit 9m which is able to move the screw 9 in a synchronised fashion with the dosing drum 1 to allow synchronisation in depositing the secondary product P2.

More specifically, the motor-driven unit 9m is able to actuate the extractor screw 9 so that a second dose D2 is deposited, at least partly, on each first dose D1.

In one embodiment, the motor-driven unit 9m is able to actuate the screw 9 so that a second dose D2 is deposited, at least partly, not on all the first doses D1, but alternatively on a first dose D1 but not on a subsequent first dose D1. This embodiment is particularly advantageous in the case of production of double chamber filter bags, which each contain two first doses D1 and a second dose D2, or in other words, a mixed dose DX and a first dose D1.

The dosing device according to the invention is therefore designed to be used for making filter bags of the single-chamber type each containing a mixed dose DX formed by a first dose D1 and a second dose D2, or double-chamber filter bags each containing two mixed doses DX, or a mixed dose DX and a first dose D1.

The motor-driven unit 9m is connected to a machine control unit 13 which is able to monitor and control the feeding of the continuous strip 2 of filter material, the movement of the dosing drum 1 and the movement of the extractor screw 9.

This invention also provides a method for feeding infusion products comprising the following steps:

preparing a continuous strip 2 of filter material, movable along a feed direction A;

depositing a first controlled quantity of a primary product P1, defining a first dose D1, on the continuous strip 2 of filter material in such a way as to define a succession of first doses D1, equidistant from each other, by means of the dosing drum 1 rotating about an axis X;

depositing a second controlled quantity, different from the first quantity and defining a second dose D2, of a secondary aromatising or sugar product P2, on a corresponding first dose D1 deposited on the continuous strip 2 of filter material in transit, by means of an extractor screw feeder 9 to define a mixed dose (DX) of primary product P1 and secondary aromatising product P2.

The step of depositing the second controlled quantity of the secondary aromatising product P2 may be performed alternatively on the first doses D1 of primary product P1 in transit on the continuous strip 2 of filter material, in such a way as to define successive doses having alternatively a first dose D1 of only primary product P1 and a mixed dose DX of primary product P1 and secondary product P2.

The invention claimed is:

1. A dosing device for feeding infusion products, comprising:
    a dosing drum rotating about an axis; the dosing drum being positioned between a continuous strip of filter material, movable along a feed direction, and a primary hopper for containing a primary infusion product;
    the dosing drum including a plurality of radial chambers each configured for receiving a quantity of primary product forming a first dose at the primary hopper and, respectively, releasing the first dose above the continuous strip of filter material, in such a way as to form a succession of first doses, equidistant from each other, along the continuous strip of filter material, the radial chambers being movable in rotation the primary hopper, where the radial chambers receive the first doses and above the continuous strip of filter material where the radial chambers release the first doses;
    an independent dosing unit for feeding a secondary aromatizing or sugar product defining a second dose, the independent dosing unit being positioned downstream of the dosing drum relative to the feed direction of the continuous strip of filter material;
    the independent dosing unit including controlled release elements configured for placing the second dose at least partly on a corresponding first dose deposited on the continuous strip of filter material passing under the independent dosing unit to define a mixed dose of primary product and secondary product;
    the independent dosing unit comprising a feed channel for feeding the secondary product and an extractor screw positioned in the feed channel and constituting the controlled release elements.

2. The device according to claim 1, wherein the controlled release elements are configured for depositing a quantity of secondary product forming the second dose different from the quantity of primary product forming the first dose deposited on the continuous strip of filter material from the radial chamber.

3. The device according to claim 1, wherein the controlled release elements are configured for depositing a quantity of secondary product forming the second dose less than the quantity of primary product forming the first dose deposited on the continuous strip of filter material from the radial chamber.

4. The device according to claim 1, wherein the feed channel and the extractor screw have a corresponding axis of longitudinal extension positioned inclined at an angle relative to the feed direction.

5. The device according to claim 1, wherein the independent dosing unit comprises a secondary hopper configured to contain the secondary product and in flow communication with the controlled release elements.

6. The device according to claim 1, and further comprising a frame supporting the independent dosing unit, the frame interposed between the independent dosing unit and the dosing drum.

7. The device according to claim 1, further comprising a shaped guard, positioned downstream of the dosing drum and configured to fold the continuous strip of filter material to define a continuous tube of filter material which surrounds the mixed doses of primary product and secondary product, the shaped guard including an opening, the controlled release elements being coupled to the shaped guard at the opening, so that the secondary product moves from the controlled release elements to the continuous strip of filter material through the shaped guard.

8. The device according to claim 1, and further comprising a motor connected to the extractor screw to move the extractor screw in synchronization with respect to the dosing drum for synchronizing placement of the second doses with respect to the first doses.

9. The device according to claim 1, and further comprising a motor connected to the extractor screw to move the extractor screw in synchronization with respect to the dosing drum for synchronizing placement of the second doses with respect to the first doses, wherein the synchronization includes placement of the second doses only on alternate first doses to form a series of first doses alternating with mixed doses containing both first doses and second doses.

10. The device according to claim 1, wherein the feed channel for feeding the product secondary includes a release opening for releasing the second dose, the release opening facing the continuous strip of filter material movable along the feed direction.

11. The device according to claim 10, wherein the feed channel includes an end narrowing defining the release opening.

12. The device according to claim 3, wherein the extractor screw, positioned along the feed channel, has an end at the end narrowing of the feed channel.

13. A method for feeding infusion products comprising the following steps:
preparing a continuous strip of filter material, movable along a feed direction;
depositing a first controlled quantity of a primary infusion product, defining a first dose, on the continuous strip of filter material in such a way as to define a succession of first doses, equidistant from each other, via a dosing drum rotating about an axis;
downstream of the depositing of the first controlled quantity of the primary infusion product, relative to the feed direction of the continuous strip of filter material, depositing a second controlled quantity, different from the first quantity and defining a second dose, of a secondary aromatizing or sugar product, on a corresponding first dose deposited on the continuous strip of filter material in transit, via an extractor screw feeder, to define a mixed dose of primary product and secondary aromatizing or sugar product.

14. The method according to claim 13, wherein the depositing of the second controlled quantity of the secondary aromatizing or sugar product is performed alternatively on the first doses of primary product in transit on the continuous strip of filter material, in such a way as to define successive doses having alternatively a first dose of only primary product and a mixed dose of primary product and secondary product.

* * * * *